(12) United States Patent
Walton et al.

(10) Patent No.: US 6,357,466 B1
(45) Date of Patent: Mar. 19, 2002

(54) PUMPING SYSTEM FOR THE INJECTION OF MEASURED QUANTITIES OF FLUID INTO A FLUID STREAM

(75) Inventors: Frank A. Walton, Fort Worth; Edward Grout, Corinth, both of TX (US)

(73) Assignee: Dosmatic USA, Inc., Carrollton, TX (US)

( * ) Notice: Subject to any disclaimer, the term of this patent is extended or adjusted under 35 U.S.C. 154(b) by 0 days.

(21) Appl. No.: 09/327,201

(22) Filed: Jun. 7, 1999

(51) Int. Cl.[7] .............................................. G05D 11/03
(52) U.S. Cl. ...................... 137/99; 417/200; 418/202
(58) Field of Search ........................ 137/99; 222/129.2; 417/199.2, 200, 406; 418/201.1, 201.2, 202

(56) References Cited

U.S. PATENT DOCUMENTS

| | | | | |
|---|---|---|---|---|
| 1,103,053 A | * | 7/1914 | Kiefer | 418/202 |
| RE16,406 E | * | 8/1926 | Barton | 417/200 |
| 2,567,997 A | * | 9/1951 | Granberg | 137/99 |
| 2,611,323 A | * | 9/1952 | Digney | 418/202 X |
| 3,213,873 A | * | 10/1965 | Cordis | 137/99 |
| 3,575,535 A | * | 4/1971 | Bickar | 417/244 |
| 5,156,301 A | * | 10/1992 | Hassell et al. | 222/129.2 |

* cited by examiner

*Primary Examiner*—Stephen M. Hepperle
(74) *Attorney, Agent, or Firm*—Samkey & Luck L.L.P.

(57) ABSTRACT

A pump system for the selected injection of one or more fluids is disclosed where the system generally includes a flow meter including a means to translate the flow rate through the meter to one or more pumps coupled to the meter such that upon a selected introduction of fluid flow through the meter a selected amount of fluid is pumped through the one or more pumps.

1 Claim, 7 Drawing Sheets

PUMPING SYSTEM FOR THE INJECTION OF MEASURED QUANTITIES OF FLUID INTO A FLUID STREAM

BACKGROUND OF THE INVENTION

1. Field of the Invention

The present invention is directed to an apparatus and method for metering fluid. More particularly, the present invention is directed to an apparatus to injected a predetermined amount of a liquid into a fluid stream and methods for its use.

2. Description of the Prior Art

Several devices have been developed for injecting predetermined quantities of liquid additives into a liquid flow stream for such applications as adding medication to drinking water with additives such as chlorine or iodine and adding fertilizer concentrate to irrigation water. An exemplary device which is powered by the liquid stream to which the additive is being injected is described in U.S. Pat. Nos. 3,937,241 and 4,060,351 as issued to Philippe Cloup. In the apparatus described in the Cloup patents, the additive or adjuvant is injected into the main fluid stream within a piston chamber of a hydraulic motor which drives the additive injection pump.

The architecture for this metering pump, however, is disadvantageous when the additive is a corrosive fluid such as chlorine, fertilizer or other chemically active substance. Accordingly, it is desirable to be able to inject the additive into the liquid stream at a point downstream of the motor which is powering the additive pump to avoid problems associated with the corrosive action of the additive.

To accomplish this objective, a number of fluid pumps have been designed which inject the additive into the primary fluid stream where the primary fluid provides the motive fluid for activating the additive injection pump. Such a device is described for example in applicants' U.S. Pat. No. 4,558,715 as issued to Walton.

While overcoming many of the disadvantages of prior fluid injection system, the apparatus described in the Walton patent involves a number of components which are subject to wear and subsequent failure. Elastic or elastomeric biasing components necessary in a piston drive pump are particularly prone to fatigue and failure. Moreover, the use of a piston and its auxiliary components enhance production and manufacturing costs.

SUMMARY OF THE INVENTION

The present invention addresses the above and other disadvantages of prior art metering pumps by providing a system which includes a minimum of moving components in a robust design to selectively inject a second and/or a third fluid in a fluid stream, where the second and third fluid constitute a predetermined percentage of the total mixture.

In one embodiment, the present invention is directed to an apparatus for generating a mixture of a first fluid and measured quantities of a second fluid, wherein the second fluid constitutes a predetermined percentage of the ultimate mixture. In one aspect, the system includes a flow meter which includes an inlet in fluid communication with the first fluid, a fluid outlet and first and second gears positioned between the outlet and inlet. The gears of the flow meter are meshed together and counter rotate relative to each other when the first fluid, e.g. water, is directed through the inlet to the outlet.

A shaft is connected coaxially to the first gear and the first gear of a cavity gear pump. The cavity gear pump includes a first and a second gear disposed in a housing and includes an inlet and an outlet. Each of the first and second gears define a transverse cavity or pocket to receive and pump a liquid from the inlet to the outlet. Because the first gear of the cavity pump is connected through the shaft to the first gear of the flow meter, a predetermined amount of the second fluid is pumped through the outlet of the cavity pump when a predetermined amount of the first fluid is directed through the flow meter.

In another aspect of the invention, a second shaft is coaxially coupled to the second gear of the flow meter and a first gear of a second cavity gear pump which also includes an inlet and an outlet where the inlet is coupled to a reservoir of a third fluid and the outlet is coupled to the fluid stream. In such a fashion, a third fluid may be selectively metered and introduced into the fluid stream.

The present invention offers a number of advantages over prior art metering pumps. One such advantage is a robust design which requires a minimum of moving components. In such a fashion, the apparatus is relatively inexpensive to manufacture and maintain.

Another advantage of the present invention is its lack of dependance on elastic biasing components to accomplish the metering process.

Another advantage is the ability to avoid contamination of the fresh water supply by introducing the metered additive concurrently with the metered water into the treatment pool. In such a fashion, inadvertent backflow will not result in a contamination of the water supply.

Yet other advantages include quiet operation, a compact size when compared to competitive devices and a low pressure loss across the inlet and outlet of the pump.

DETAILED DESCRIPTION OF THE PREFERRED EMBODIMENTS

Figure 1:
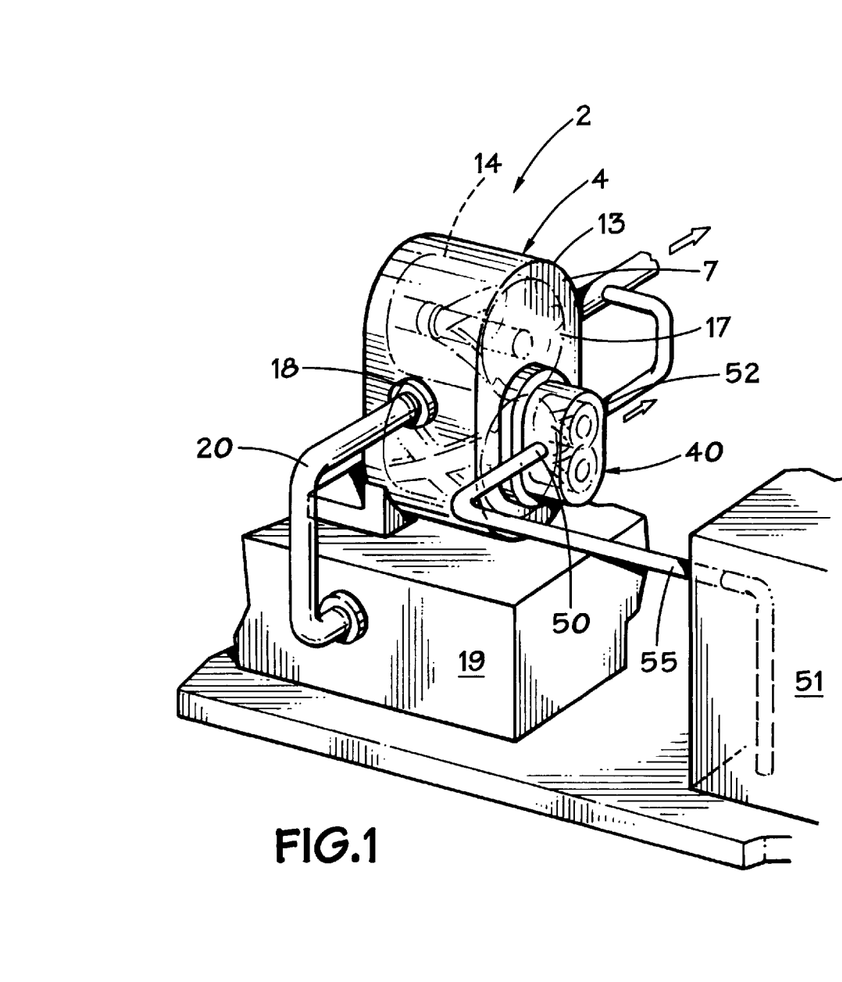
FIG. 1 illustrates a perspective, partially phantom view of one embodiment of the present invention operative for the injection of a metered, second fluid.
Figure 1A:
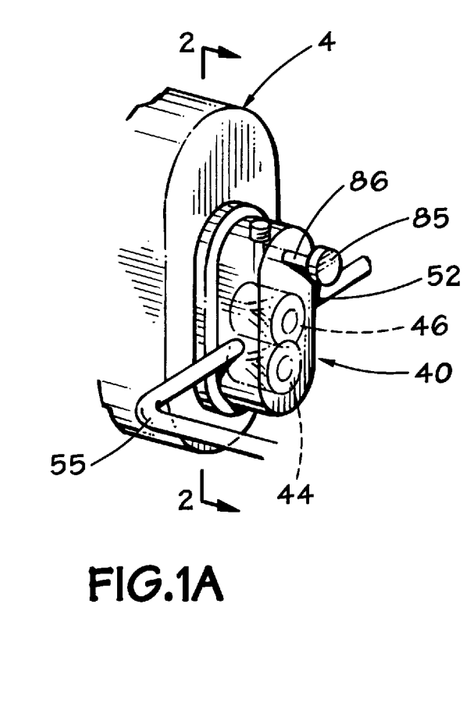
FIG. 1A illustrates a detail, perspective view of the embodiment illustrated in FIG. 1.

One embodiment of the pumping system of the present invention may be seen reference to FIGS. 1 and 1A.

As illustrated, the pumping system 2 includes a flow meter 4 to which is mounted a metering pump 40 where flow meter 4 includes a housing 13, a fluid inlet port 18 and a fluid outlet 17. As intended by the present invention, flow meter broadly means a device which has at least one movable element, and the movable element can be moved when fluid is directed through the device. In the embodiment shown in FIGS. 1–1A, the flow meter 4 is a gear-type flow meter, as more fully described below.

In the illustrated embodiment, the fluid inlet port 18 of the flow meter 4 is connected to a fluid conduit 20. More specifically, in one presently preferred embodiment, conduit 20 includes an angular threaded connector 18 which can rotate relative to said conduit, and the connector can be engaged with threads that are formed on inlet port 18. In turn, conduit 20 is situated in fluid communication with a water supply or other source of fluid 19. It is to be understood that conduit 20 can be connected to a water supply by any suitable means known in the art, e.g., by connecting conduit 20 to a fitting or nozzle that is in turn in fluid communication with a water supply.

The housing 13 of flow meter 4 comprises a top wall 17, a bottom wall 11 and a side wall 14 where each of the aforereferenced elements are adapted to be combined to form a substantially fluid tight unit. Typically, housing 13 includes some sort of access means, e.g., an access plate (not shown), to allow for inspection, repair and replacement of the internal components of flow meter 4.

Figure 2:
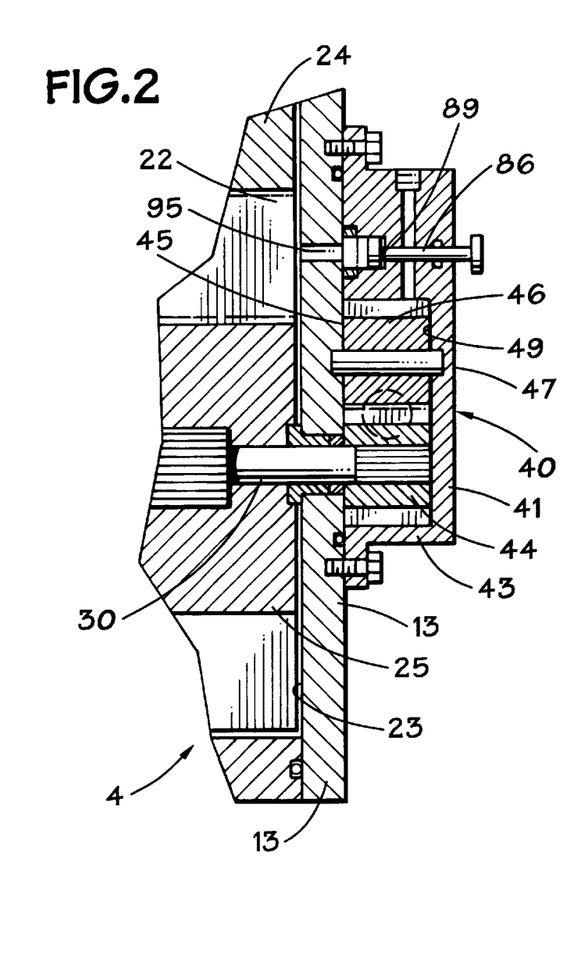
FIG. 2 illustrates a side, cross sectional view of the embodiment illustrated in FIG. 1.

In accordance with the present invention, flow meter 4 includes one or more rotational elements which, in the embodiment shown in FIGS. 1–2, include a first gear 24 and a second gear 25 which rotate when the pressurized first fluid passes from the inlet 18 port to the outlet port 17.

By reference to FIG. 2, gears 24 and 25 are disposed within an internal cavity 23 defined by housing 13. In some embodiments, gears 24 and 25 may be provided with magnetic inserts (not shown). The introduction of fluid through inlet 18 rotates gears 24 and 25, thereby moving inserts 92 past a point on the housing 13, which contains means to detect the rotation of said insert 92. The frequency of this rotation may then be monitored to determine a flow rate.

In the embodiment illustrated in FIGS. 1–2, metering pump 40 includes a housing 41 defining an internal cavity 49 in which are disposed a pair of intermeshing, counter rotating rotors 44 and 46. Housing 41 includes a sidewall 43, a bottom wall 45 and a top wall 47, the combination adapted to be sealed to form a fluid tight compartment defining an inlet 50 and an outlet 52, where inlet 50 is disposed in fluid communication with a reservoir 51 of a second fluid via conduit 55.

In some embodiments, the bottom wall 45 of pump 40 may compromise the top wall 17 of flow meter 4. In such a fashion, economy of construction may be observed.

Figure 6:
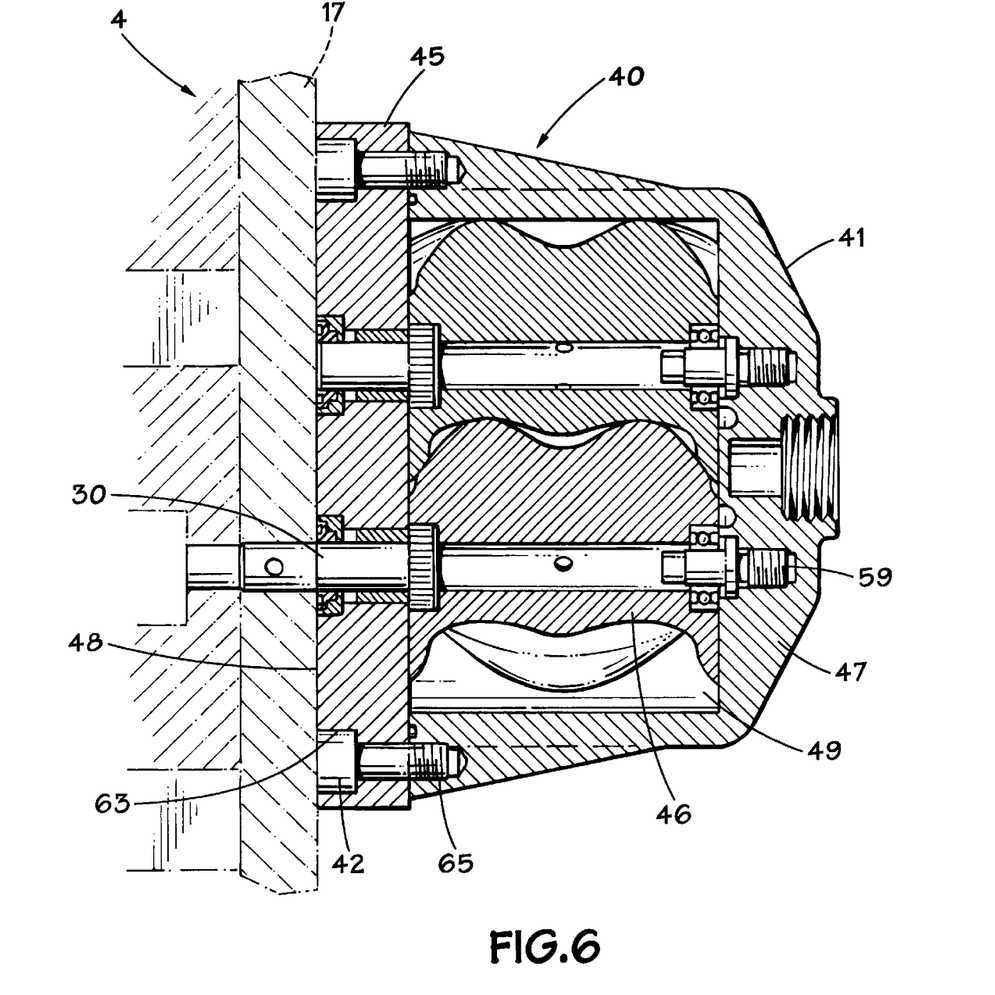
FIG. 6 illustrates a side, cross sectional view of a helical gear pump.
Figure 7:
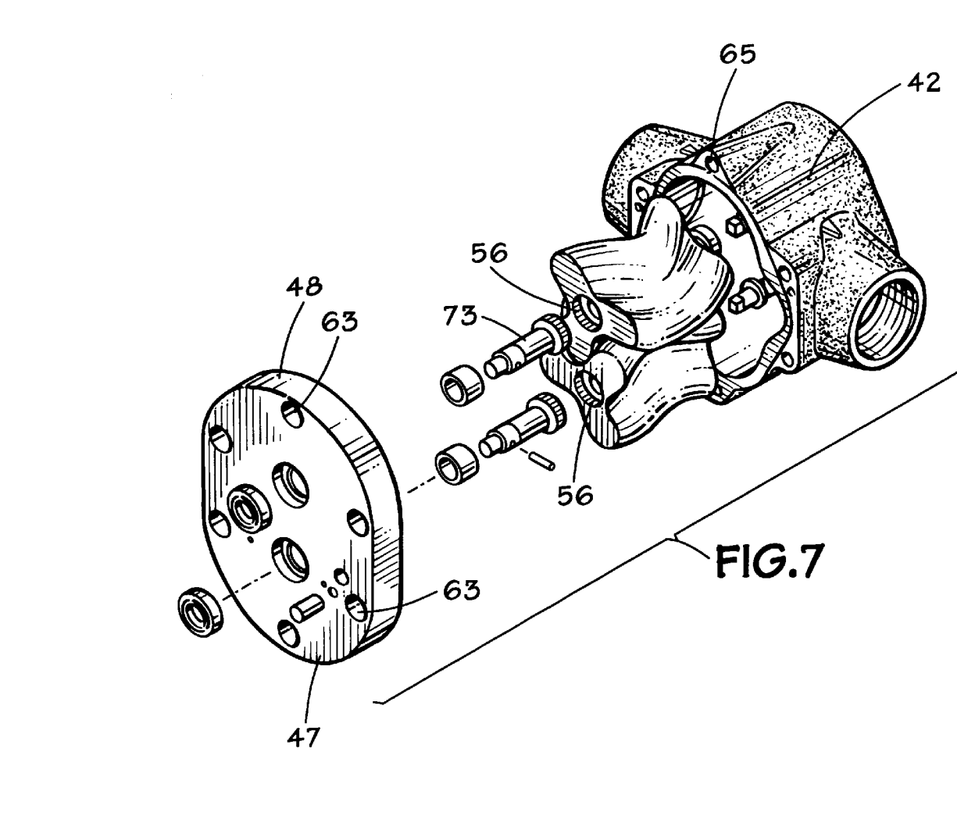
FIG. 7 illustrates an exploded view of the helical pump illustrated in FIG. 6.

By reference to FIGS. 1A, 6 and 7, it is desired that rotors 44 and 46 define a tooth pattern which promotes a maximum amount of fluid flow from inlet 50 to outlet 52. It may be desirable to utilize a helical tooth pattern such as that disclosed in U.S. Pat. No. 5,415,041, the disclosure of which is herein incorporated by reference. Other tooth patterns, however, are also contemplated within the spirit of the invention. For example, it may also be desirable to adopt a herringbone or straight tooth pattern to advance the objects of the invention.

By reference to FIGS. 6 and 7, rotors 44 and 46 are preferably provided with a system of bearings to enhance smoother and low drag operation. Top wall 47 preferably comprises a cover to close the cavity 49 by fitting on a machined face of said housing 41 which is bolted in place with bolts 42 which extend through openings 63 of cover 48 into aligned receivers 65 in housing 41.

The buildup of deposits, e.g., calcium and precipitants from the additive solution, is a major cause for premature failure of cavity gear pumping systems. In some applications therefore, it may be desirable to utilize a metering pump housing which defines a close tolerance between rotors 44 and 46 and the pump outlet 52, the walls defining cavity 49 and the pump inlet 50. In such a fashion, any deposits collecting about the inlet 50 or outlet 52 are continuously sheered off by rotors 44 and 46 during the operation of pump 40.

In the embodiment illustrated in FIGS. 1 and 2, a connecting element 30, e.g., a spline, is coupled to first rotor 25 of flow meter 4 and extends through flow meter housing 13 into operative engagement with the rotor 44 of pump 40. In such a fashion, the rotation of gear 24 as induced by the flow of the first fluid from the inlet 18 to outlet 17 rotates the first rotor 44 and hence second rotor 46. The counter rotation of rotors 44 and 46 create a partial vacuum in housing 41, thereby inducing fluid flow of the second fluid from reservoir 51 through conduit 55 into inlet 50 and ultimately through outlet 52.

The coupling of rotor 24 to rotor 44 of pump 40 allows for the metered input of the additive second fluid based on the flow valve of the fluid as dictated by the rotation of rotors 24 and 25. The proportions of the additive fluid may be varied based upon the ratio of the size of rotors 24 and 25 vis-a-vis rotors 44 and 46. Alternatively, spline 30 may be formed to include a manually adjustable gear down assembly (not shown) to allow the ratio of the additive fluid to be altered.

By reference to FIGS. 1A and 2, in one aspect of the invention, pump 40 may be provided with priming means which comprises a piston 86 slidably situated in a bore 89 which is disposed in fluid communication with cavity 23 of flow meter 4 via access bore 95. Reciprocation of piston 86 in bore 89 allows the first fluid, e.g. water, to pass through bore 89 into cavity 23, thereby priming pump 40.

It is contemplated that it may be desirable in some situations to introduce the additive fluid downstream of flow meter 4. In other applications, however, the pump outlet 52 may be disposed upstream of meter 4 or concomitant with flow meter outlet 17.

Figure 3:
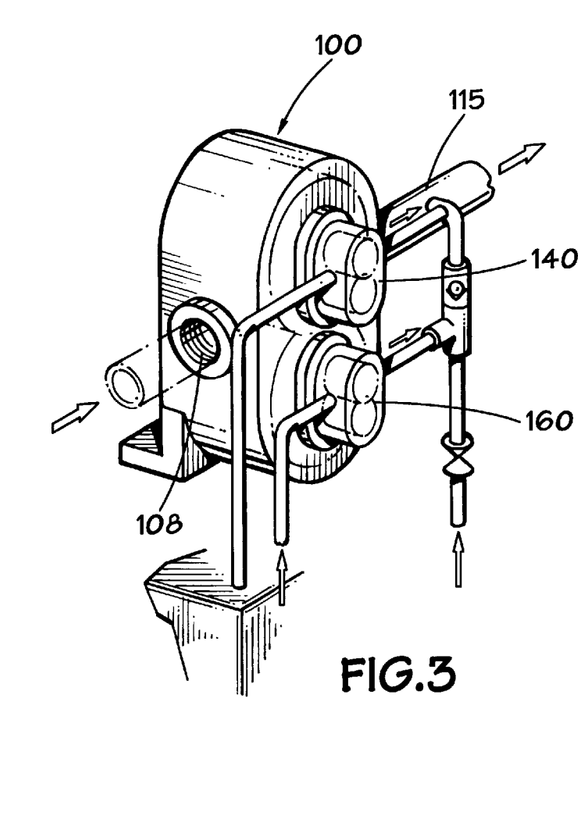
FIG. 3 illustrates a perspective view of a second embodiment of the present invention operative for the injection of a second and a fluid.
Figure 4:
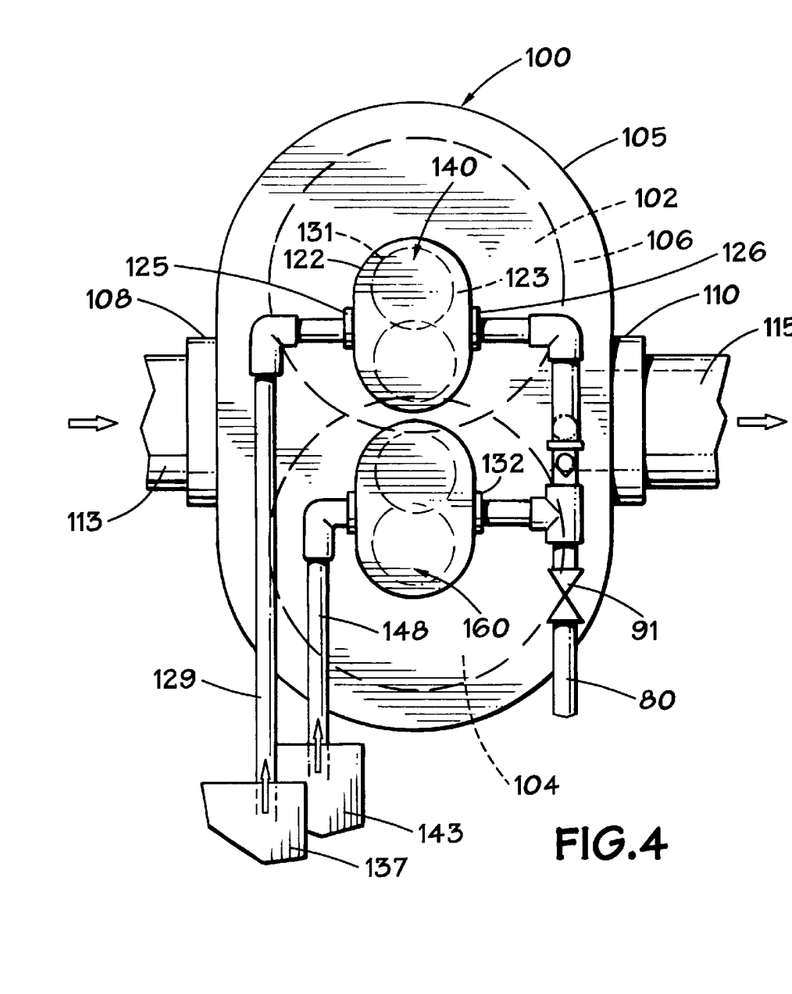
FIG. 4 illustrates a top view of the embodiment illustrated in FIG. 3.

A second embodiment of the present invention may been seen by reference to FIGS. 3–4 in which is illustrated a flow meter 100 of the general configuration as described above in relation to the embodiment of FIGS. 1 and 2, where such flow meter 100 includes a first 102 and second 104 rotational element rotatingly disposed within an internal cavity 106 defined within a housing 105 which also includes an inlet 108 and an outlet 110. Inlet 108 is disposed in fluid communication with a first source of fluid, e.g., water, through a conventional conduit 113 or other similar fluid flow member. Outlet 110 is likewise coupled to a conduit 115, as illustrated.

A first metering pump 140 and a second metering pump 160 are joined to flow meter 100 in a similar manner to that described in relation to the embodiment of FIGS. 1 and 2. In this connection, one or both of first 140 and second pumps 160 may share a common wall with flow meter 100. Alternatively, either or both of first and second pumps may be formed integrally with flow meter in a common housing with means provided for the separation of fluid flow. Still alternatively, first or second pumps may be raised or separated from flow meter 100 as long as means are provided for the translation of the rotation of the rotational element(s) of flow meter 100 to said first and second pumps. This later arrangement may be helpful, for example, where it is desirable to remove one or more metering pumps from exposure from the heat of the primary fluid passing through flow meter 100. Such an arrangement, may also be helpful when there exists space and design concerns. This design also provides an air gap to separate the source of drive water and the chemical being pumped.

Each of metering pumps 140 and 160 include, in the example of the first pump 140, a housing 122 defining an internal cavity 123 and an inlet 125 and an outlet 126, where said inlet 125 is coupled to a second source of fluid 137 by a conduit 129. In this embodiment, at least one rotational element 131 is rotatably disposed in cavity 123 such that the rotation of said element 131 induces fluid flow through inlet 125 and outlet 126.

A connecting element 120, e.g., a spline, is coupled to one or both of rotational elements 102 and 104 and to at least one of the rotor elements disposed in both first and second pumps 140 and 160, respectively. In such a fashion, the flow of fluid from inlet 108 to outlet 110 of flow meter 100 rotates first and second rotational elements 102 and 104 and at least one of the rotors disposed in each of first and second pumps 140 and 160. As described above in relation to prior embodiments, the rotation of rotors in pumps 140 and 160 induces fluid flow from each of reservoirs 137 and 143 through respective fluid inlets 148 and 129 and through outlets 126 and 132 and ultimately through valve 91 and common flow passage 80. In the embodiment illustrated in FIG. 4, additive second and third fluids are introduced to the fluid stream through housing 105. Alternatively, one or more of the additive fluids may be introduced in the outflow conduit 115 as illustrated in FIG. 3.

In some applications, it may be desirable to include means to divert at least a portion of an additive fluid back to the fluid reservoir. Such reticulation may be important, for example, when the additive fluid is prone to settling. By reference to FIG. 4, a valve 91 may be disposed in outlet conduit 80 such that upon partial opening of valve 91 a portion of the additive fluid is diverted back to the fluid reservoir.

Figure 5:
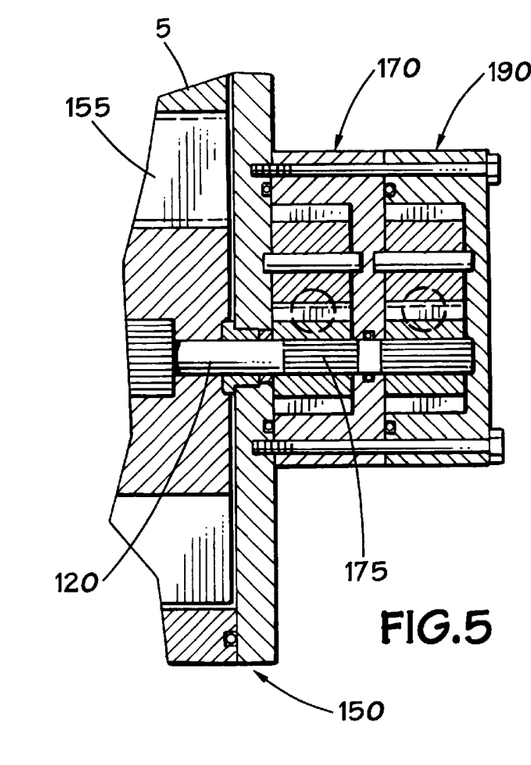
FIG. 5 illustrates a side, cross sectional view of a third embodiment of the present invention.

Yet another embodiment of the present invention may be seen by reference to FIG. 5 in which is illustrated a flow meter 150, a first pump 170 and a second pump 190. Flow meter 150 is configured in much the same fashion as described above in relation to other embodiments and may adopt a variety of configurations. It is desired, however, that meter 150 include a fluid tight housing 151 defining an inlet and an outlet, where at least one rotor element 155 is disposed therebetween. Similarly, pumps 170 and 190 may also adopt a number of configurations involving the use of at least one rotational element which is coupled to element 155. In this connection, it is contemplated that one or both of pumps 170 and 190 may incorporate counter rotating helical gears of the type illustrated in FIGS. 6 and 7 or may alternatively utilize a single rotor formed in a cavity disposed in a housing. In each case, however, it is desirable that the rotor element of pumps 170 and 190 be rotationally coupled to at least one of the rotational elements of the flow meter 150.

In the illustrated embodiment, pumps 170 and 190 are arranged in a vertical or "stacked" relationship with respect to one another as to share a common interconnecting element or spline 175. In such a fashion, the rotation of the rotational element of flow meter 150 results in the rotation of rotors in each of pumps 170 and 190 to include the metered flow of second or third fluids as described above. As set forth above, the ratio of the injection of the second and first fluids may be determined as a function of the ratio of the respective gear size between each of pumps 170 and 190 to flow meter 150. Alternatively, a compound spline 175 may be employed which allows for the selective adjustment of the rotation of one or both of pumps 170 and 190 vis-a-vis metering pump 150.

The immediately aforedescribed embodiment may be desirable due to space constraints or design limitations.

Figure 8:
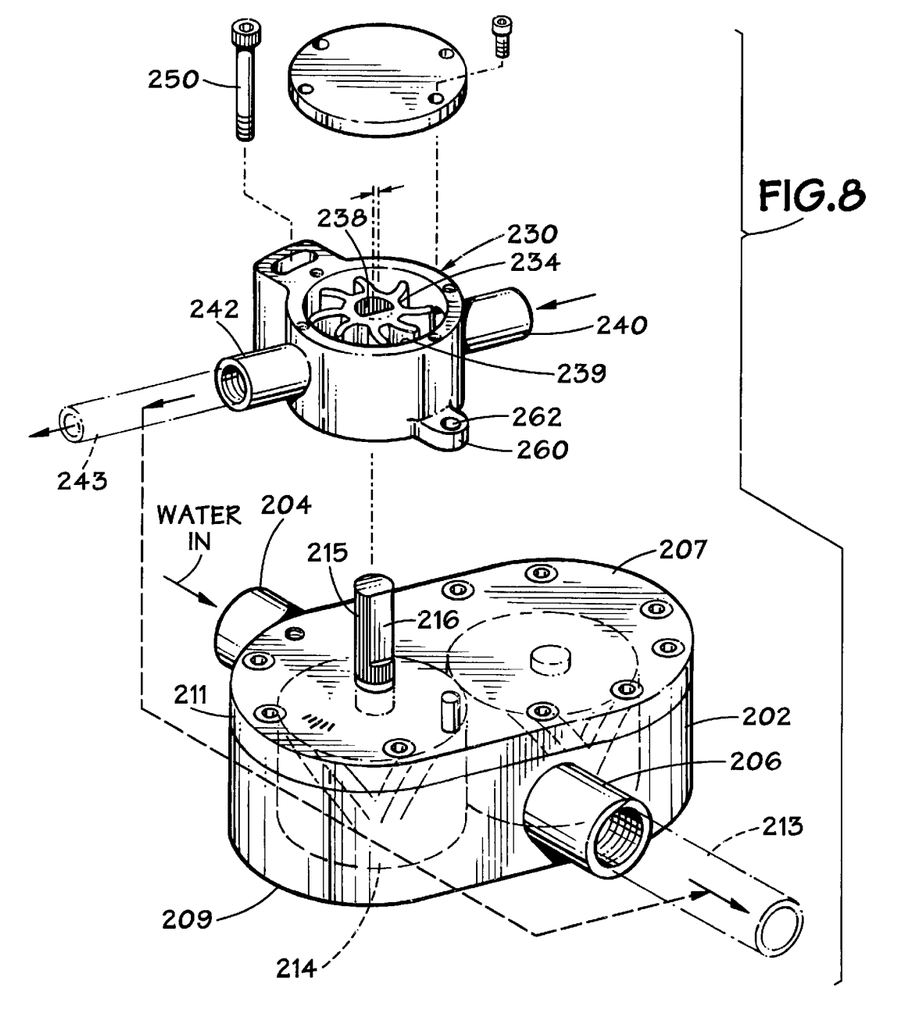
FIG. 8 illustrates a perspective, assembly view of a fourth embodiment of the invention utilizing an impeller.
Figure 9:
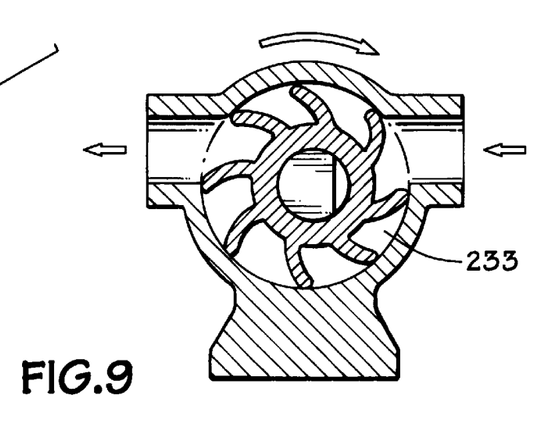
FIG. 9 illustrates a cross section of an impeller as it may be used with the embodiment of FIG. 8.

Yet another embodiment of the invention may be seen by reference to FIGS. 8 and 9 in which is illustrated a flow meter 200 which includes a housing 202, a fluid inlet port 204 and a fluid outlet 206, as described previously in relation to other embodiments. Housing 202 itself comprises a top wall 211, a bottom wall 209 and a side wall 202. Consistent with prior embodiments, flow meter 200 includes one or more rotational elements 214 (as shown in phantom) which rotate about shafts and include an extended spline 215 which extends outside housing 202. In the illustrated embodiment, spline 215 includes a flat 216 to aid in engaging pump 230, as will be described below.

By reference to FIGS. 8–9, pump 230 includes a housing 232 which is generally circular in configuration and which defines a substantially circular bore 239, a fluid inlet 240 and an outlet 242. Bore 239 is receivable to an impeller 234 which is adapted to rotate about a hub 239. It is contemplated that hub 239 includes a fixed shaft engageable with spline 215 so as to transfer the rotation of spline to impeller 234 so as to pull fluid from inlet 240 through outlet 242.

As illustrated, impeller 234 is eccentrically disposed in bore 239, which eccentricity is adjustable depending on desired flow rates. Housing 232 includes an adjustment flange 260 which includes a pivot aperture 262 about which housing 232 may be pivoted in a plane coplanar with the plane described by housing top 211. The pivot of housing 232 serves to distort the shape of impeller 234 so as to increase or decrease the quantity of fluid moved through said pump 230. In this connection, impeller 234 is preferably made from a pliable compound, e.g. rubber, which allows resilient deformation. Impeller 234 itself defines a number of fins which will be familiar to those skilled in the art.

It is contemplated that the aforedescribed adjustment to impeller 234 may be made manually and gauged about gradations scored on top 207. Alternately, a flow gauge (not shown) may be situated in the outflow line (not shown) and manual adjustments made from this flow gauge. Still alternately, pump 230 may be remotely adjusted, e.g. by a stepper motor, to achieve a desired and preprogrammed flow rate. In the instance of manual adjustment, pump housing 232 may be secured to meter housing 202 about a particular orientation by a screw 250, as illustrated.

Fluid metered through pump 230 need not be necessarily introduced into flow meter 200, to outlet 206 or outlet line 213 immediately downstream from outlet 206. Instead, the metered additive may be carried in a separate line 243 which may parallel water outlet line 209, where lines 209 and 243 coterminate at a given point, e.g., the mixing pool. In such a fashion, inadvertent backflow will not result in a contamination of the water supply.

Figure 10:
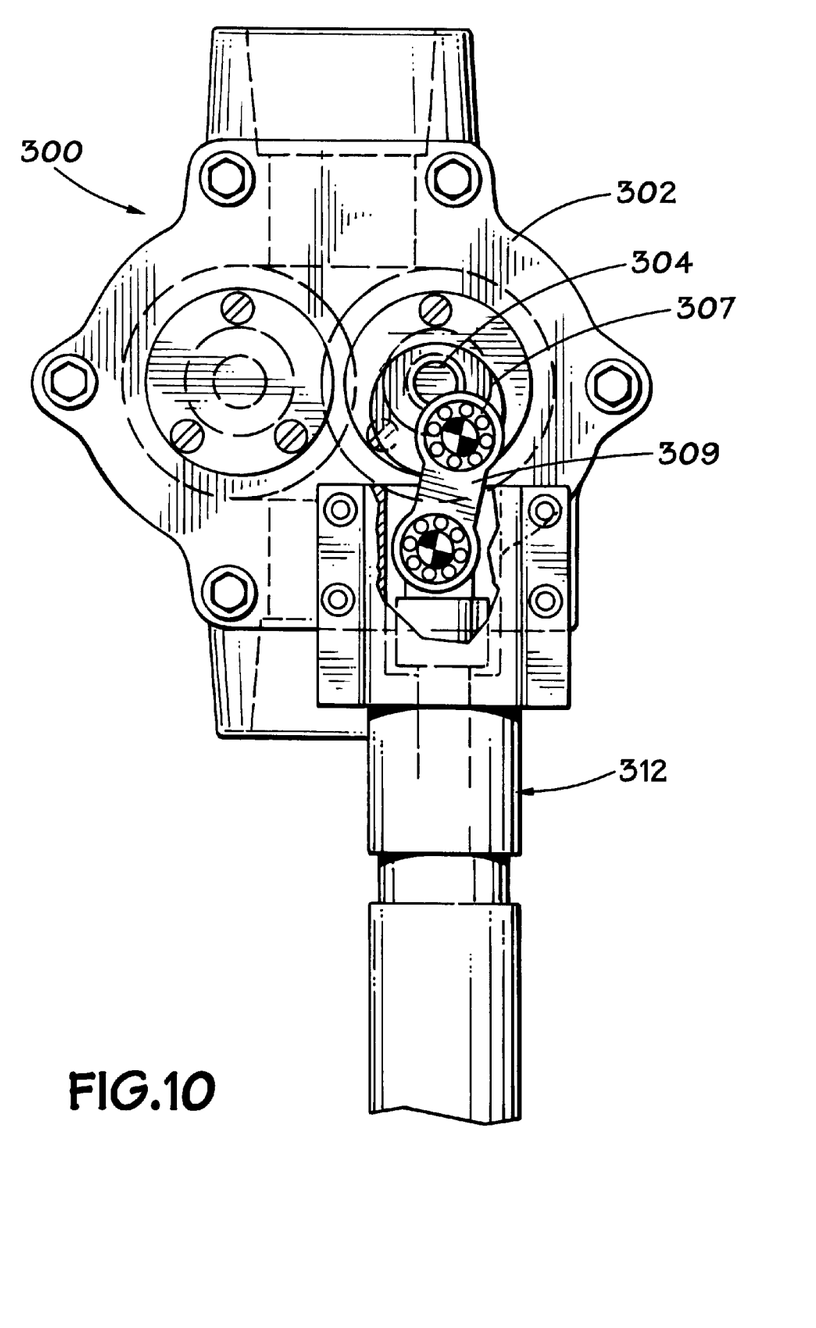
FIG. 10 illustrates yet another embodiment of the invention.

Still another embodiment of the invention may be seen by reference to FIG. 10 in which is illustrated a flow meter 300 defining a housing 302 and at least one interior metering element which is rotated about the introduction of fluid through meter 300 in a manner consistent with that described above. In the illustrated embodiment, at least one of the rotatable elements includes a spline 304 which extends beyond housing 302 and is coupled to a cam wheel 307 which in turn is coupled to a crank 309 in a manner familiar to those skilled in the art. Crank 309 is in turn coupled to a metering pump 312 of a design generally disclosed and claimed in U.S. Pat. No. 4,558,715.

In such a fashion, the introduction of water into meter 300 turns at least one rotatable element which in turn acts upon crank 309 and pump 312 to induce a metered flow of fluid, e.g. medication or chemicals. The amount of fluid introduced through pump 312 may be adjusted in a conventional fashion as disclosed in Applicant's prior patents, U.S. Pat. Nos. 4,809,731 and 4,558,715.

Although particular detailed embodiments of the apparatus and method have been described herein, it should be understood that the invention is not restricted to the details of the preferred embodiment. Many changes in design, composition, configuration and dimensions are possible without departing from the spirit and scope of the instant invention.

What is claimed is:

1. A system for generating a mixture of a first fluid and a second fluid, wherein the second fluid constitutes a predetermined percentage of the ultimate mixture, said system comprising:

a flow meter having an inlet in fluid communication with the first fluid, an outlet, and at least one rotatable element positioned between the inlet and the outlet, wherein said rotatable element rotates about an axis when the first fluid is directed through the inlet to the outlet, said element disposed in a housing defining top, bottom and side walls;

a shaft coupled to the rotatable element; and a pump comprising an impeller eccentrically disposed within a second housing between an inlet for a second fluid and an outlet, where said impeller element is operably coupled to said shaft such that a predetermined amount of the second fluid is pumped through the outlet of the pump when a predetermined amount of the first fluid is directed through the inlet of the flow meter to the outlet of the flow meter.

* * * * *

UNITED STATES PATENT AND TRADEMARK OFFICE
CERTIFICATE OF CORRECTION

PATENT NO. : 6,357,466 B1
DATED : March 19, 2002
INVENTOR(S) : Frank A. Walton and Edward Grout It is certified that error appears in the above-identified patent and that said Letters Patent is hereby corrected as shown below:

<u>Column 8,</u>
Lines 2-22, claim 1 should read:

1. Apparatus for injecting a predetermined quantity of a fluid additive into a fluid stream to produce an ultimate fluid mixture wherein the fluid additive constitutes a predetermined percentage of the ultimate fluid mixture, comprising:

a flow meter having a pair of rotating elements disposed in a housing between an inlet for a pressurized fluid stream and an outlet for the fluid stream, said rotating elements becoming rotational at a rate of rotation dependent upon a rate of flow of the fluid stream between the inlet and the outlet;

a shaft coupled to one of the rotating elements of the flow meter to rotate therewith and extending through a wall of the flow meter housing;

a fluid additive metering pump mounted to the wall of the flow meter housing, said metering pump having a pair or intermeshing, counter-rotating elements disposed in a housing between an inlet for a fluid additive and an outlet for the fluid additive, said fluid additive outlet being coupled to the flow meter outlet to inject the fluid additive into the fluid stream, at a point downstream of the flow meter; and one of the counter-rotating elements being coupled to the shaft to rotate therewith and the second of the counter-rotating elements being mounted on an axle carried in a wall of the metering pump housing, said intermeshing counter-rotating elements being driven by rotation of the shaft to create a partial vacuum in the metering pump housing to induce a flow of a fluid additive to the metering pump outlet for injection into the fluid stream to form a fluid mixture having a predetermined percentage of the fluid additive. - -

Signed and Sealed this

Sixteenth Day of September, 2003

JAMES E. ROGAN
*Director of the United States Patent and Trademark Office*